United States Patent
Genoe

(10) Patent No.: US 9,905,159 B2
(45) Date of Patent: Feb. 27, 2018

(54) DIGITAL DRIVING OF ACTIVE MATRIX DISPLAYS

(71) Applicants: IMEC VZW, Leuven (BE); Nederlandse Organisatie voor Toegepast-Natuurwetenschappelijk Onderzoek TNO, 's Gravenhage (NL)

(72) Inventor: Jan Genoe, Messelbroek (BE)

(73) Assignees: IMEC VZW, Leuven (BE); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 94 days.

(21) Appl. No.: 14/440,219

(22) PCT Filed: Oct. 30, 2013

(86) PCT No.: PCT/EP2013/072746
§ 371 (c)(1),
(2) Date: May 1, 2015

(87) PCT Pub. No.: WO2014/068017
PCT Pub. Date: May 8, 2014

(65) Prior Publication Data
US 2015/0302795 A1    Oct. 22, 2015

Related U.S. Application Data

(60) Provisional application No. 61/721,343, filed on Nov. 1, 2012.

(51) Int. Cl.
*G09G 3/3225* (2016.01)
*G09G 3/20* (2006.01)
(Continued)

(52) U.S. Cl.
CPC .......... *G09G 3/3225* (2013.01); *G02F 1/13* (2013.01); *G09G 3/2003* (2013.01);
(Continued)

(58) Field of Classification Search
None
See application file for complete search history.

(56) References Cited

U.S. PATENT DOCUMENTS 5,710,571 A * 1/1998 Kuo ............... G09G 3/3648
345/208
2004/0032380 A1  2/2004 Kanauchi
(Continued)

FOREIGN PATENT DOCUMENTS

EP    1 647 966 A1    4/2006

OTHER PUBLICATIONS

PCT International Search Report and Written Opinion, PCT International Application No. PCT/EP20131072746, dated Jan. 10, 2014.

Primary Examiner — Nicholas J Lee
Assistant Examiner — Duane N Taylor, Jr.
(74) Attorney, Agent, or Firm — McDonnell Boehnen Hulbert & Berghoff LLP

(57) ABSTRACT

A method for digital driving of an active matrix display with a predetermined frame rate is described. The display contains a plurality of pixels organized in a plurality of rows and a plurality of columns. The method includes representing each of the plurality of pixels of an image to be displayed within a frame by an n-bit digital image code. The method also includes dividing the image frame into sub-frames, which may be of substantially equal duration. Within each sub-frame, the method includes sequentially selecting at least one of the plurality of rows twice. Upon a first selection, a first digital code is written to the selected row
(Continued)

and upon a second selection a second digital code is written to the selected row. There is a predetermined time delay between the second selection and the first selection. Digital driving circuitry is also described.

19 Claims, 10 Drawing Sheets

(51) Int. Cl.
*G09G 3/3233* (2016.01)
*G09G 3/3258* (2016.01)
*G09G 3/3266* (2016.01)
*G02F 1/13* (2006.01)
*G09G 3/36* (2006.01)

(52) U.S. Cl.
CPC ......... *G09G 3/2018* (2013.01); *G09G 3/2025* (2013.01); *G09G 3/3233* (2013.01); *G09G 3/3258* (2013.01); *G09G 3/3266* (2013.01); *G09G 3/36* (2013.01); *G09G 3/3648* (2013.01); *G09G 2300/08* (2013.01); *G09G 2310/027* (2013.01); *G09G 2310/0286* (2013.01); *G09G 2310/061* (2013.01); *G09G 2320/0247* (2013.01); *G09G 2320/043* (2013.01); *G09G 2330/02* (2013.01)

(56) References Cited

U.S. PATENT DOCUMENTS

| | | |
|---|---|---|
| 2006/0044231 A1 | 3/2006 | Seki et al. |
| 2006/0139265 A1 | 6/2006 | Kimura |
| 2007/0200803 A1* | 8/2007 | Kimura ................ G09G 3/2014 345/76 |
| 2013/0141469 A1 | 6/2013 | Xu |

\* cited by examiner

DIGITAL DRIVING OF ACTIVE MATRIX DISPLAYS

CROSS-REFERENCE TO RELATED APPLICATION

The present application is a U.S. national stage entry of International Application No. PCT/EP2013/072746 filed Oct. 30, 2013, which claims priority to U.S. Provisional Patent Application No. 61/721,343 filed on Nov. 1, 2012, the contents of each of which are hereby incorporated by reference.

FIELD OF THE INVENTION

The present invention relates to the field of digital driving of displays. More specifically it relates to methods for digitally driving active matrix displays, for instance AMO-LED (Active Matrix Organic Light Emitting Diode) displays and to digital driving circuitry for active matrix displays, for instance AMOLED displays.

BACKGROUND OF THE INVENTION

Current state of the art backplanes for AMOLED displays use a pixel driver circuit for each OLED, each pixel driver circuit driving a predetermined current through the corresponding OLED. Multiple pixel driver circuit schematics are being implemented, which all comprise a drive transistor (such as M1 in FIG. 1) driving the predetermined current through the OLED.

In an analog driving method an amplitude modulation approach is used, wherein each OLED emits light during a full frame period with an intensity corresponding to the required gray level. The current through the OLED is determined in accordance with an analog data voltage on the floating gate of the drive transistor M1. As this transistor M1 preferably operates in saturation for accurate current control, the current through the OLED (and thus the OLED luminance) varies with the square of the M1 gate voltage. This introduces non-linearity in the display response, limits accuracy and makes the display sensitive to noise. An overall display architecture as schematically shown in FIG. 2 is currently used for analog driven displays. At one edge of the display, a select line driver integrated circuit is provided. The select lines are digitally driven, for instance by a running one, cycling at a rate corresponding to the frame rate. At another edge of the display, data line driver circuitry is provided for driving the data lines. The data lines are driven by an analog voltage, keeping the pixels at a constant luminance during an entire image frame.

In a digital driving method a Pulse Width Modulation approach can be used, wherein each OLED emits light during a portion of a frame period, at a single luminance. In this approach the portion of the frame period during which an OLED emits light has a duration corresponding to the required gray level. A pulse current having a duty ratio in accordance with the data voltage is supplied to each OLED. In such known approach, a frame is divided into n sub-frames, wherein n is the number of bits used for digitally representing the image data. These n sub-frames may have a different duration, there being a ratio $1:2:4:8: \ldots :2^{n-1}$ between the different sub-frame durations. In each sub-frame a pixel (OLED) is either ON or OFF. In this way $2^n$ different gray levels can be created. A display architecture is used wherein select lines (for instance rows) are digitally driven by dedicated timing control circuitry and wherein data lines (for instance columns) are driven by a digital voltage, as schematically illustrated in FIG. 3.

US 2013/0141469 discloses a device for driving an AMOLED display comprising OLEDs arranged in rows and columns and a pixel circuit for driving each OLED, a scan line for selecting the pixel circuits of each row and a data line for controlling the pixel circuits of each column. Each OLED is controlled by scan signal (through the scan line) and signal generation (through the data line) using current pulses during a sub-frame with a duration depending of the bit position. OLEDs are driven the longest (longest sub-frame) for the data corresponding to the most significant bit, and the shortest (shortest sub-frame) for the least significant bit. This method requires a high power consumption and the utilization of the pixel illumination is discontinuous and suboptimal, and the implementation of colour depth above six bit is difficult.

FIG. 4 shows a comparison between a typical analog pixel driving method (dashed lines) and a digital pixel driving method (full lines). In an analog driven pixel, the pixel luminance is constant during each image frame period and it can be different from frame to frame. The pixel luminance can have $2^n$ different levels. In a digital driven pixel, a pixel is at full luminance(ON) during part of a frame period and at zero luminance (OFF) during the remaining part of the frame period. FIG. 4 is only a schematic representation, not showing a division in sub-frames for the digital driving approach.

SUMMARY OF THE INVENTION

It is an object of embodiments of the present invention to provide good methods for digital driving of active matrix displays, such as for instance, but not limited thereto, AMOLED displays, based on Pulse Width Modulation.

The above objective is accomplished by a method and device according to embodiments of the present invention.

It is an advantage of embodiments of the present invention that the digital select line driving circuitry is less complex and less space consuming as compared to prior art digital driving solutions. It is an advantage of embodiments of the present invention that the required switching speed of transistors in the backplane can be reduced as compared to prior art solutions.

In a first aspect, the present invention relates to a method for digital driving of an active matrix display, such as for instance an AMOLED display, with a predetermined frame rate. The display comprises a plurality of pixels logically organized in a plurality of rows and a plurality of columns. The method according to embodiments of the first aspect comprises: representing each of the plurality of pixels of an image to be displayed within a frame (pixel intensity data to be displayed) by an n-bit digital image code; dividing the image frame into a natural number of sub-frames; within each sub-frame sequentially selecting each of the plurality of rows, wherein at least one of the plurality of rows is selected twice, wherein upon a first selection a first digital code is written to the selected row and upon a second selection a second digital code is written to the selected row, there being a predetermined time delay between the second selection and the first selection. The predetermined time delay can be different for different sub-frames.

The sub-frames do not necessarily have to have the same duration within a frame, but both possibilities (substantially same duration and different duration) are explained and further developed as embodiments of the present invention.

The second selection of each row can take place for at least 35% of the sub-frames, or for at least half, or for at least 75%, for example 80% or more, 85% or more or at least 90% of the sub-frames. The second selection of the plurality of rows can for instance take place in all but the last few sub-frames, or in all but the first few sub-frames. It is an advantage of embodiments of the present invention that the utilization of the pixels, e.g. OLEDs in case of AMOLED displays, may be optimized within a frame, driving the pixels with data from the image data code most of the frame period.

In particular embodiments of the present invention, dividing the image frame into a number of sub-frames, for instance but not restricted thereto, of substantially equal duration, may comprise dividing the frame into N sub-frames, N being equal to the number of bits n. This embodiment may be applied whether the number of bits n in the digital image code representing the image to be displayed equals a natural power of two or not.

It is an advantage of embodiments of the present invention that the division is straightforward and easy to implement.

In other embodiments of the present invention wherein the number of bits n in the digital image code representing the image to be displayed is not a natural power of two, the image frame may be divided in N sub-frames, for instance but not limited thereto, of substantially equal duration, wherein N is chosen as the natural power of two superior to and closest to the number of bits n.

In other embodiments, the frame can be divided in any number of sub-frames, for instance N sub-frames where N has no predefined relationship with the number of bits n.

In embodiments of the present invention, the predetermined time delay between the second selection of a row and the first selection of that row in the $x^{th}$ sub-frame may correspond to $\frac{1}{2}^{N-x}$ of the sub-frame duration. This may be particularly useful in case of sub-frames of equal length. The first digital code written to the selected row within the $x^{th}$ sub-frame may correspond to the $x^{th}$ least significant bit of the corresponding digital image code and the second digital code is a logical zero. This may be applied whether N equals n, or N equals the power of two superior, and closest, to n. The output will be different in general: in case N equals n, all sub-frames will be driven with data, albeit possibly for short times in sub-frames corresponding to bits with lesser significance. In cases in which N equals the power of two closest and superior to n, only the first n sub-frames will be driven with data, and for comparatively shorter sub-frame period. The rest of sub-frames may be driven with zeros.

In embodiments of the present invention, each sub-frame may be further divided into time slots, for instance $2^n/N$ time slots. These time slots may be of substantially equal duration, although the present invention is not limited thereto.

In embodiments of the present invention, $2^{m-1}$ time slots may be assigned to the $m^{th}$ bit of the n-bit image code.

For at least some sub-frames, the first digital code written upon the first selection of a row may correspond to a first predetermined bit of the corresponding n-bit digital image code and the second digital code written upon the second selection of that row may correspond to a second predetermined bit of the corresponding n-bit digital image code. Exceptions may be made for at least one digital code in one time slot (e.g. the first digital code in the first time slot) which is a logical zero. In this case, the predetermined time delay corresponds to a predetermined number of time slots. In previous embodiments, the time delay may be equal to $\frac{1}{2}^{N-x}$ of the sub-frame duration (for the $x^{th}$ sub-frame), but it is an advantage of embodiments of the present invention that this delay may be tuned, using the time slots, to optimize the utilization of the pixel, e.g. OLED in the particular case of AMOLED displays. In this particular case of OLED displays, optimal use of the OLEDS may for instance optimize its degradation due to ageing. The predetermined time delay, the first predetermined bit and the second predetermined bit for each of the sub-frames may be selected in view of obtaining a good duty cycle. Preferably the time delay between the first and the second selection in a sub-frame is not smaller than the time delay in a preceding sub-frame.

In embodiments of the present invention, writing the first code and writing the second code comprises driving the first code and the second code using pulse-width modulation.

It is an advantage that methods according to embodiments of the present invention can be used with existing active matrix display backplanes, e.g. AMOLED display backplanes. As compared to prior art solutions, only a modification of the driving circuitry is needed.

It is an advantage that methods according to embodiments of the present invention allow operating the drive transistors of the backplane in the linear regime, resulting in a substantial reduction of power consumption.

In another aspect, the present invention relates to digital driving circuitry for driving, with a predetermined frame rate, an active matrix display such as for instance an AMOLED display, comprising a plurality of pixels logically organized in a plurality of rows and a plurality of columns, so as to display subsequent frames of an image to be displayed, the image being represented by an n-bit digital image code for each pixel. The digital driving circuitry comprises digital select line driving circuitry for sequentially selecting the plurality of rows and digital data line driving circuitry for writing digital codes to the pixels in a selected row. The digital select line driving circuitry is adapted for sequentially selecting, within one sub-frame, at least one of the plurality of rows twice, so as to, upon a first selection, write a first digital code to the selected row, and, upon a second selection, write a second digital code to the selected row, there being a predetermined time delay between the second selection and the first selection.

In an embodiment, wherein the set-up is such that an image frame is divided into N sub-frames, the digital select line driving circuitry may be adapted for generating a first running one for the first selection and a second running one for the second selection, both cycling at N times the predetermined frame rate, there being a predetermined time delay between the first selection and the second selection within each sub-frame. This way, the digital select line driving circuitry is adapted for sequentially selecting at least one of the plurality of rows, and preferably most of the plurality of rows, twice. The digital data line driving circuitry is synchronized with the digital select line driving circuitry so that data is written into the pixels, for instance OLED pixels in case of an AMOLED display, at appropriate moments in time. The digital data line driving circuitry is configured to write at the first running one a first digital code to the selected row and to write at the second running a second digital code to the selected row. Hence, digital select line driving circuitry can be used for sequentially selecting the plurality of rows and digital data line driving circuitry can be used for writing digital codes to the pixels in a selected row according to the method disclosed in the present invention.

The time delay may be controlled by a time delay determination circuit for determining the predetermined time delay between the second selection and the first selection.

The time delay determination circuit may comprise a shift register, for instance a static shift register or a dynamic shift register. In particular embodiments, the time delay determination circuit can for example comprise a first linear array of flip-flops, for instance D-flip-flops, for cycling the first selection and a second linear array of flip-flops, for instance D-flip-flops, for cycling the second selection. The digital driving circuitry according to embodiments of the present invention can furthermore comprise a linear array of multiplexers for driving the row select lines. The number of flip-flops in each array and the number of multiplexers corresponds to the number of rows in the display. In each array, an output of a flip-flop is connected to an input of a next flip-flop in the array, and to an input of a corresponding multiplexer. In operation, a first logical one advances through the first array of flip-flops and a second logical one advances through the second array of flip-flops, progressing one step at each clock pulse, there being a delay corresponding to a predetermined number of clock pulses (and hence to a predetermined number of flip-flops) between the first logical one and the second logical one.

Alternatively, instead of multiplexers, output enable circuits driven by clocks may be used. In this case, two selections may not be driven by the same output enable circuit. As the delay between two running one bits in the shift register is always a power of 2, any driving scheme that avoids equal driving of lines that are a power of 2 separated, is an appropriate drive scheme. Possible driving schemes are amongst others systems with 3 or 5 clocks where the output enables are cycled amongst these 3 or 5 clocks. Driving systems with another odd number of clocks are also possible, but the use of more clocks complicates the driving scheme and hence the system.

A third aspect of the present invention provides an active matrix display such as for instance, the present not being limited thereto, an AMOLED display, which may comprise any suitable kind of pixel elements, for instance OLED elements (polymeric, polydendrimeric, fluorescent or phosphorescent, etc) arranged in an array, and arranged for being driven by digital driving circuitry according to embodiments of the second aspect.

An active matrix display, e.g. an AMOLED display, according to embodiments of the third aspect may be arranged for being driven by a method according to embodiments of the first aspect of the present invention.

Particular objects and advantages of various aspects have been described herein above. Of course, it is to be understood that not necessarily all such objects or advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein. Further, it is understood that this summary recites merely some examples and is not intended to limit the scope of the disclosure. The disclosure, both as to organization and method of operation, together with features and advantages thereof, may best be understood by reference to the following detailed description when read in conjunction with the accompanying drawings.

Figure 1:
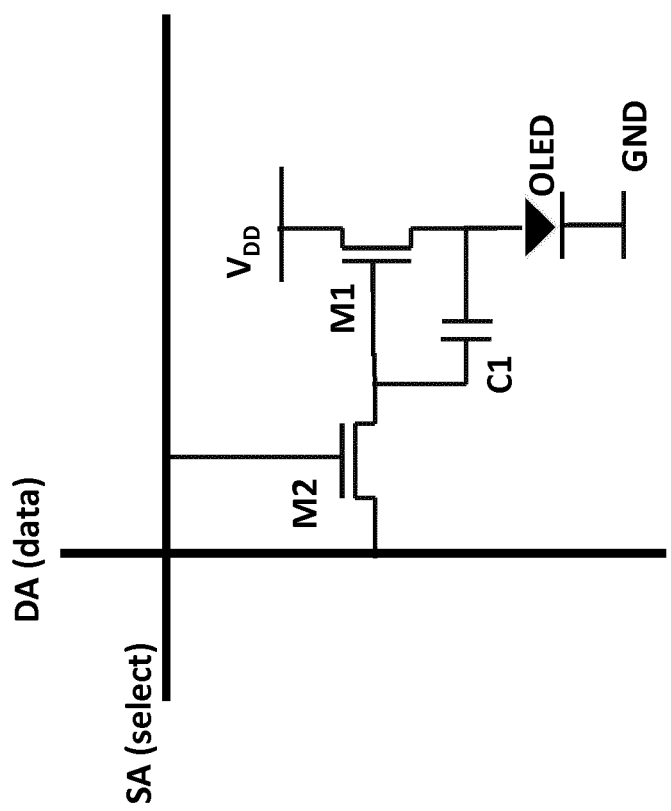
FIG. 1 schematically shows an example of a prior art AMOLED pixel driver circuit, wherein an analog voltage on the gate of the drive transistor M1 determines the OLED luminance.
Figure 2:
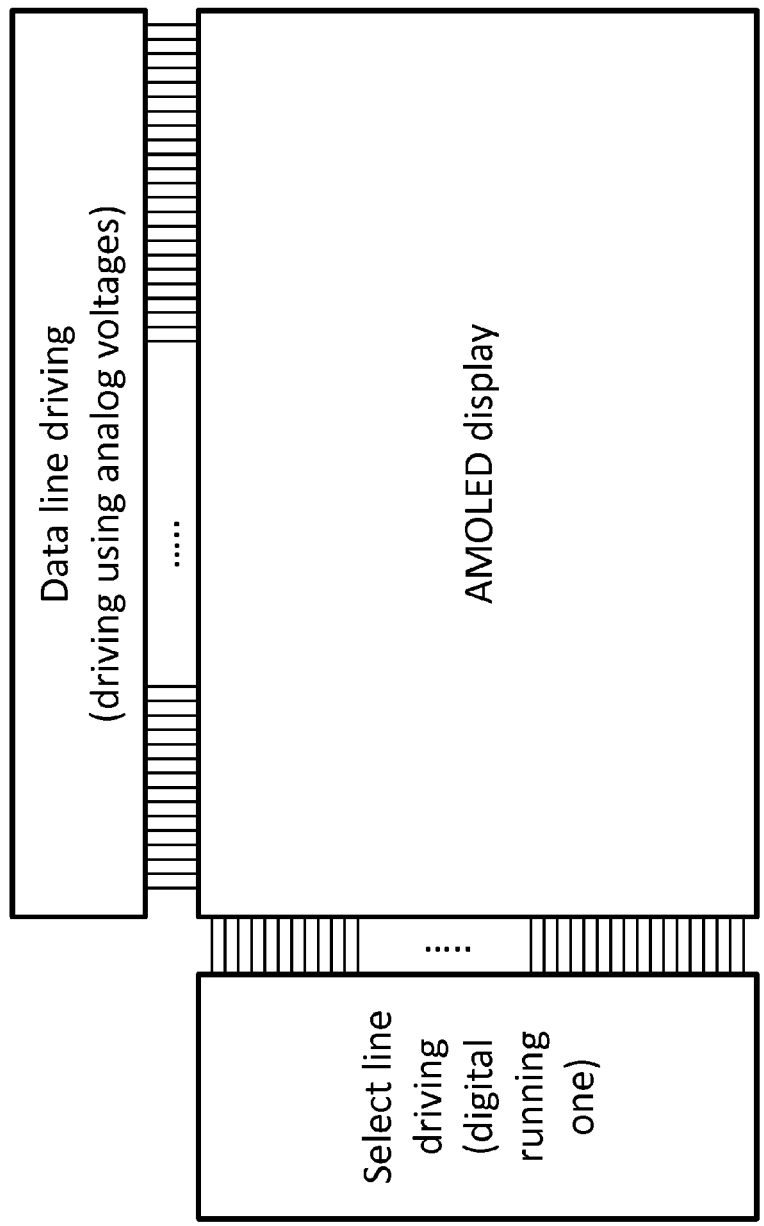
FIG. 2 schematically shows a prior art AMOLED display architecture using an analog driving method.
Figure 3:
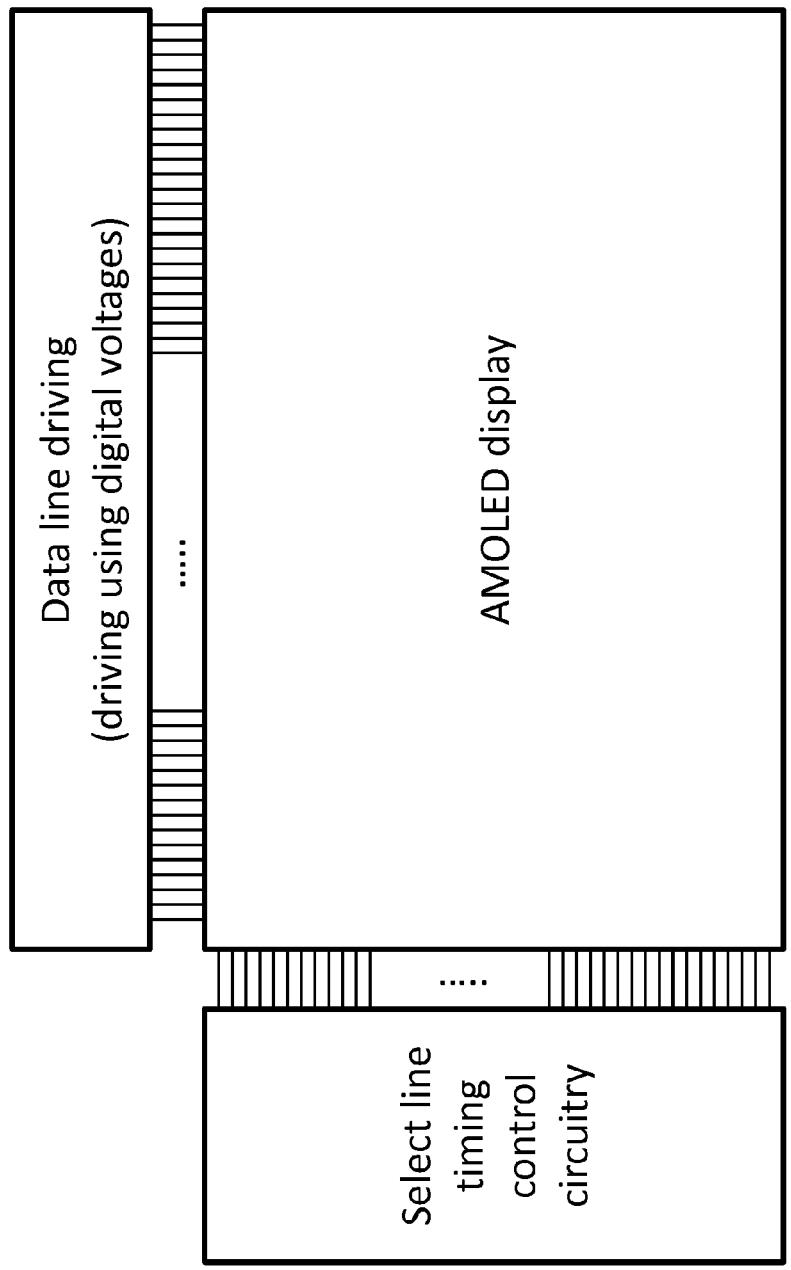
FIG. 3 schematically shows a prior art AMOLED display architecture using a digital driving method.
Figure 4:
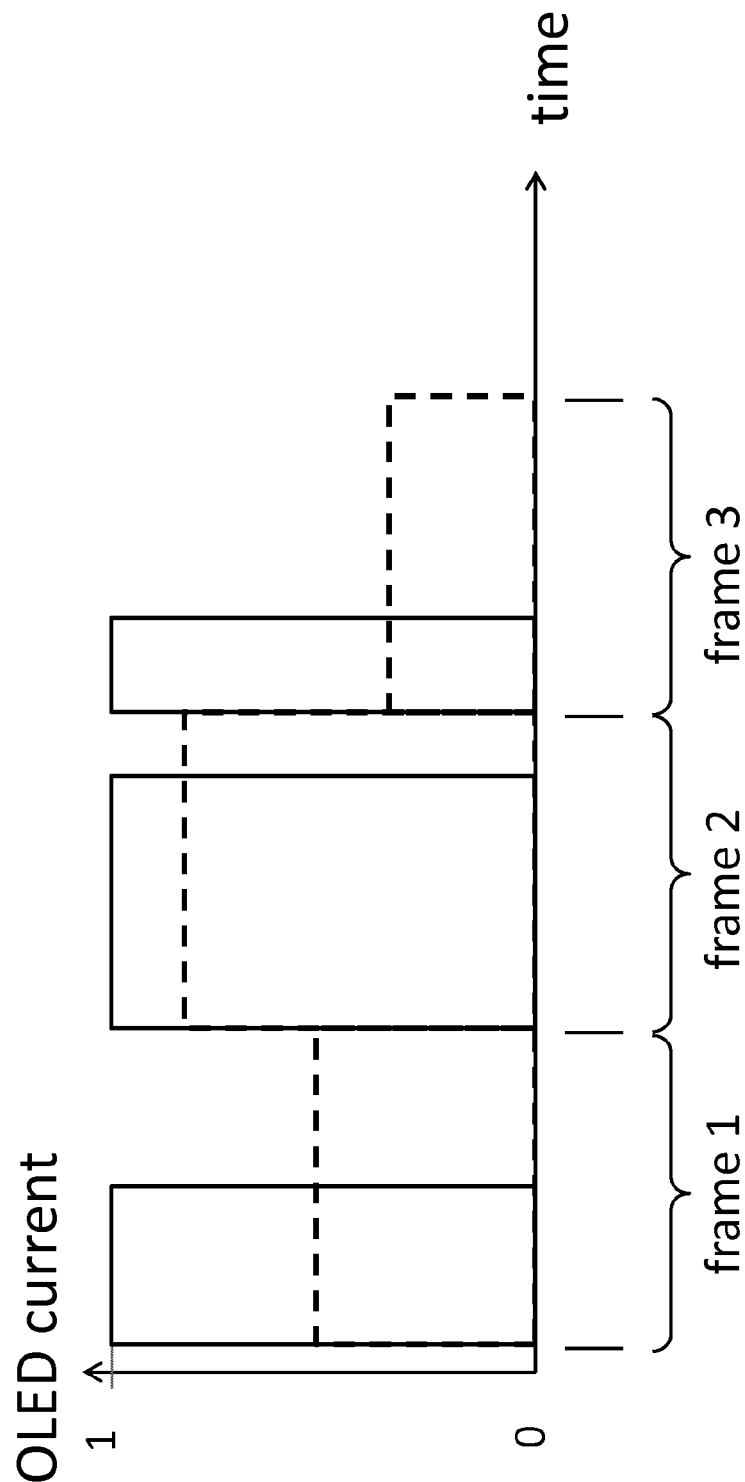
FIG. 4 shows a comparison in OLED current output between an analog pixel driving method as in FIG. 2 (dashed lines) and a digital driving method as in FIG. 3 (full lines).

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

In the following detailed description, numerous specific details are set forth in order to provide a thorough understanding of the present invention and how it may be practiced in particular embodiments. However, it will be understood that embodiments of the present invention may be practiced without necessarily having all these specific details. In other instances, well-known methods, procedures and techniques have not been described in detail, so as not to obscure the disclosure. While the present invention will be described with respect to particular embodiments and with reference to certain drawings, the invention is not limited hereto. The drawings included and described herein are schematic and are not limiting the scope of the disclosure.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

OLED displays are displays comprising an array of light-emitting diodes in which the emissive electroluminescent layer is a film of organic compound which emits light in response to an electric current. OLED displays can either use passive-matrix (PMOLED) or active-matrix (AMOLED) addressing schemes. In case of OLED displays, the present invention relates to AMOLED displays. The corresponding addressing scheme makes use of a thin-film transistor backplane to switch each individual OLED pixel on or off. AMOLED displays allow for higher resolution and larger display sizes than PMOLED displays.

The present invention, however, is not limited to AMOLED displays, but in a broader concept relates to active matrix displays. Any type of active matrix displays may use the concepts of embodiments of the present invention, although AMOLED displays are particularly advantageous in view of the current switching speeds of their pixel elements. It is advantageous if the pixel elements of the active matrix displays can switch faster, as this allows to obtain higher frame rates, hence less flickering images.

An active matrix display, e.g. an AMOLED display, according to embodiments of the present invention comprises a plurality of pixels, each comprising a pixel element, e.g. an OLED element. The pixel elements are arranged in an array, and are logically organised in rows and columns. Throughout the description of the present invention, the terms "horizontal" and "vertical" (related to the terms "row" of "line" and "column", respectively) are used to provide a co-ordinate system and for ease of explanation only. They do not need to, but may, refer to an actual physical direction of the device. Furthermore, the terms "column" and "row" or "line" are used to describe sets of array elements which are linked together. The linking can be in the form of a Cartesian array of lines and columns; however, the present invention is not limited thereto. As will be understood by those skilled in the art, columns and lines can be easily interchanged and it is intended in this disclosure that these terms be interchangeable. Also, non-Cartesian arrays may be constructed and are included within the scope of the invention. Accordingly the terms "row" or "line" and "column" should be interpreted widely. To facilitate in this wide interpretation, the claims refer to logically organised in rows and columns. By this is meant that sets of pixel elements are linked together in a topologically linear intersecting manner; however, that the physical or topographical arrangement need not be so. For example, the rows may be circles and the columns radii of these circles and the circles and radii are described in this invention as "logically organised" rows and columns. Also, specific names of the various lines, e.g. select line and data line, are intended to be generic names used to facilitate the explanation and to refer to a particular function and this specific choice of words is not intended to in any way limit the invention. It should be understood that all these terms are used only to facilitate a better understanding of the specific structure being described, and are in no way intended to limit the invention.

Where in embodiments of the present invention reference is made to "selection" in "first selection" and "second selection", reference is made to an action in the circuit that enables data to be introduced. This could be, for example, multiplying a bit from a data code by one in a logical implementation. Alternatively, it may be seen as running a one in a select line of a circuit, changing the state of a transistor to introduce data from a data line. Hence, a first selection followed by a second selection may comprise introducing data a first time, followed by introducing data a second time.

In the context of the present invention, a frame is a single picture or single image that is shown as part of a sequence of pictures. For example, many single images or frames can be provided in succession to produce a video or a movie. The frame rate or frame frequency is the rate or frequency at which consecutive images (frames) are formed and displayed. The frame period (fp) is a time interval equal to the reciprocal of the frame frequency. It corresponds to the display period of a single frame or image.

A frame can be divided into sub-frames. In embodiments of the present invention, the duration of each of the sub-frames of a frame may be, but does not have to be, substantially equal. In those embodiments in which each sub-frame duration is substantially equal, each frame, which has a duration of one fp, may be divided in N sub-frames with a duration of fp/N. Nonetheless, the present invention is not limited by equal duration of the sub-frames.

In some embodiments, N may be an arbitrary number. In certain embodiments, N may be equal to the number of bits used per image colour for representing the image data (N=n, n bit gray scale). For instance, exemplary embodiments are described wherein the number of sub-frames N is equal to the number of bits n, which in the example described is 8. In this example, 8 bits are used for representing each colour, e.g. for use in a 24 bit RGB (Red Green Blue) display. However, the present invention is not limited thereto, and the number of sub-frames can be different, e.g. larger or smaller than 8.

In those cases in which the number of bits n is not a power of two (i.e., n is not 4, 8, 16, etc), then N may be chosen as the number of bits n, so N=n as before; alternatively, N may be chosen equal to the power of two higher than, but closest to, n. In this case, for instance, if n=5, 6 or 7, then N=8, and if n=11, 12, 14, then N=16.

In one aspect, the present invention relates to methods for digital pixel driving of active matrix displays, for instance AMOLED displays, with a predetermined frame rate. The display comprises a plurality of pixels logically organized in a plurality of rows and columns.

The method comprises representing each of the plurality of pixels of an image to be displayed within a frame by an n-bit digital code, and dividing the image into a number (>1) of sub-frames.

The method further comprises selecting each of the plurality of rows one first time per sub-frame, and subsequently for at least one sub-frame, a second time. This implies that at least one sub-frame will be sequentially selected twice. Data code corresponding to pixel data of image pixels to be represented and, in some embodiments, dummy data or reset data (a zero) is introduced with each selection. In preferred embodiments of the present selection, this sequence of first selection and second selection takes place in at least 35% of the sub-frames, or in at least half of the sub-frames. In certain embodiments, at least 75%, 80% or even more than 90% of sub-frames are selected twice.

The first selection and the second selection are performed sequentially for at least one and preferably more of the sub-frames. This means that there is a time delay between the first selection and the second selection, and this time delay may be different for each sub-frame.

In embodiments where the number of sub-frames N equals the number of bits (N=n), the time delay in the $x^{th}$ sub-frame may equal $\frac{1}{2}^{N-x}$ of the sub-frame duration. The data introduced in each sub-frame is the bits in order from the least significant bit LSB to the most significant bit MSB. This will be seen in Example 1, for n=5, and further in the description (Example 2 for n=8, Example 3, etc.).

EXAMPLE 1

In case the number of bits n is 5 and N=n, N=5. Additionally, in this example, the sub-frames are chosen to have substantially the same duration. Further, the first selection may introduce data corresponding to intensity values of images to be represented, and the second selection may introduce a logical 0, turning the corresponding pixel OFF. In this particular embodiment, an image frame (with a frame duration of fp) will be divided in 5 sub-frames of equal length. In the first sub-frame, there will be a first selection during which data (logical 1 or logical 0) corresponding to the value of the LSB is shown by the display pixel. This takes place during $\frac{1}{2}^{5-1}=\frac{1}{16}$ of the sub-frame duration, and then the second selection during this first sub-frame turns the pixel OFF (logical 0). The second sub-frame will have the second LSB introduced and being displayed during $\frac{1}{2}^{5-2}=\frac{1}{8}$ of the sub-frame duration, the pixel being OFF the rest of the sub-frame. The process repeats until the last sub-frame, which will introduce the data corresponding to the MSB of the image data during $\frac{1}{2}^{5-5}=1$ sub-frame period. Hence only for the last sub-frame no two selection steps take place, and the pixel is correspondingly not switched off during a second part of this sub-frame (the pixel can be OFF during the complete duration of this sub-frame, if image data so requires). By having the pixels switched OFF longer periods of time, pixel degradation can be reduced, which is in particular the case when OLEDs are used as pixels in the active matrix display.

This method and time delay is also applicable to embodiments in which n is not a power of two, and N equals the power of 2 closest and superior to n, hence N>n. The time delay and input of data during selection would not, however, optimize frame utilization, because there are N sub-frames but only n bit digital image code to fill sub-frames. For example, n=5 and N=8 because it is the superior power of two ($2^3$). In this case, each frame is divided in 8 sub-frames, a selection is run for each sub-frame, but only the first n=5 sub-frames run data in the pixels. The LSB would be assigned to a $\frac{1}{2}^{8-1}=\frac{1}{128}$ of the sub-frame period in the first sub-frame, while the MSB would be assigned to $\frac{1}{2}^{8-5}=\frac{1}{8}$ of the 5$^{th}$ sub-frame. During the last 3 sub-frames, the pixel will be running with selections, but no data would be introduced, so it would be OFF for the rest of the frame period. In some cases, for instance for n=9 bits (hence, N=16), the pixel would be OFF almost half of the frame period. This may be desirable in certain applications in which the pixel should be OFF during most of the frame period. In the further disclosure, if the division of sub-frames N equals to the power of two closest (and superior) to n, then a different approach (time slot method) will be used for the calculation of time delay, as is further explained.

The reason why N may be chosen as the power of two closest (and superior) to n in embodiments of the present invention is due to optimization of time delay and selections. The time delay may be optimized to drive image data code in a first selection during a sub-frame, and a second image data code (instead of a zero, as before) in a second selection during the same sub-frame. Different embodiments of the present invention proceed in the following general way: each sub-frame is further divided in time slots, for instance $2^n/N$ timeslots, which may have substantially the same duration. The MSB is assigned a number of time slots, then the second MSB is assigned fewer time slots, etc. The LSB has the least number of time slots assigned. Then, for each sub-frame, a first selection assigns one of the bits for a certain number of time slots equal to the time delay assigned to the sub-frame, and the second selection assigns another bit for the rest of the time slots of that sub-frame. For instance, the MSB of a code could be applied to the pixel during one of the selections in several sub-frames.

Following the same system, as an example, for n=5 bits, and N=8, it is possible to drive the data to the pixel during a first and second selection in each sub-frame, for a number of time slots according to the significance of each data bit. Firstly, each sub-frame may be considered with the same duration. Each sub-frame is divided in time slots, which may also have the same duration. The number of time slots can be $2^n/N=2^5/8=4$ time slots per sub-frame (or 32 time slots for the whole frame). Now, each bit is assigned to a number of time slots according to their position, so the $m^{th}$ bit ($1 \leq m \leq n$), the first bit being the LSB and the n-th bit being the MSB, will be assigned to $2^{m-1}$ time slots. In a data code with 5 bits, EDCBA, the MSB bit E will be assigned to $2^4=16$ time slots. Bit D will be assigned to 8 time slots, C will be assigned to 4, D will receive 2 and A will be introduced in the pixel during $2^0=1$ time slot. The introduction of the data is performed twice per sub-frame, for instance according to Table 1. Each of the first three sub-frames are run with two selections. The first sub-frame is run with a zero for one time slot, the rest of the sub-frame is run with data bit E. The second sub-frame is run with two selections, one time slot for bit A, and the remaining three time slots for E. The third sub-frame is selected twice, the first 2 time slots for driving bit B, the second 2 time slots for driving E. The remainder of the sub-frames are selected only once, for the bits C, D and E, the second selection not being needed. This way, all bits are represented longer according to their significance in the data code, and this in a homogeneous way, and utilizing most of the time slots (most of the frame) for driving data in the pixel.

TABLE 1

| Sub-Frame number (length code a, code b) | code driven after running one a | code driven after running one b |
|---|---|---|
| 1 (1, 3) | 0 | E |
| 2 (1, 3) | A | E |
| 3 (2, 2) | B | E |
| 4 (4, /) | C | / |
| 5 (4, /) | D | / |
| 6 (4, /) | D | / |
| 7 (4, /) | E | / |
| 8 (4, /) | E | / |

In summary, for this type of driving method, in case the number of sub-frames N equals the power of 2 closest and superior to the number of bits n, and the sub-frames have substantially the same duration, for n-bit image code and each sub-frame divided in $2^n/N$ time slots, then $2^{m-1}$ time slots may be assigned to the $m^{th}$ bit of the n-bit image code. Then, the MSB would be assigned with $2^{n-1}$ time slots, the second MSB with $2^{n-2}$, and so on until the LSB is assigned with $2^0$ time slots (one time slot). The introduction of data is performed with two selections per sub-frame.

Similar assignments may be done for an arbitrary number of sub-frames N, even in cases in which the sub-frames may have different duration. This will be shown in Example 4, for n=8.

The selection of each row and subsequent writing of image data code may comprise driving the first code and the second code using modulation techniques, for example delta-sigma modulation, or pulse-width modulation (for instance, for image codes consisting of 7 or more bits).

In the further description, exemplary embodiments are described wherein the number of sub-frames n is equal to 8, i.e., embodiments wherein 8 bits are used for representing a plurality of colour pixels, e.g. for use in a 24 bit RGB (Red Green Blue) display. However, the present invention is not limited thereto, and the number of bits can be different, e.g., larger than or smaller than 8. For example, the present invention can be applied to 4 bit displays, to Full HD displays (12 or 14 bit) or Ultra HD 4k display (16 bit), which will be also described in lesser detail.

In a colour display, e.g., a 24 bit RGB display, an 8 bit code may be used for each colour separately. The display then contains a plurality of columns for red (represented by an 8 bit code), a plurality of columns for green (also represented by an 8 bit code) and a plurality of columns for blue (represented by an 8 bit code). The present invention may be applied to other type of colour displays, for instance RGBW displays.

Figure 5:
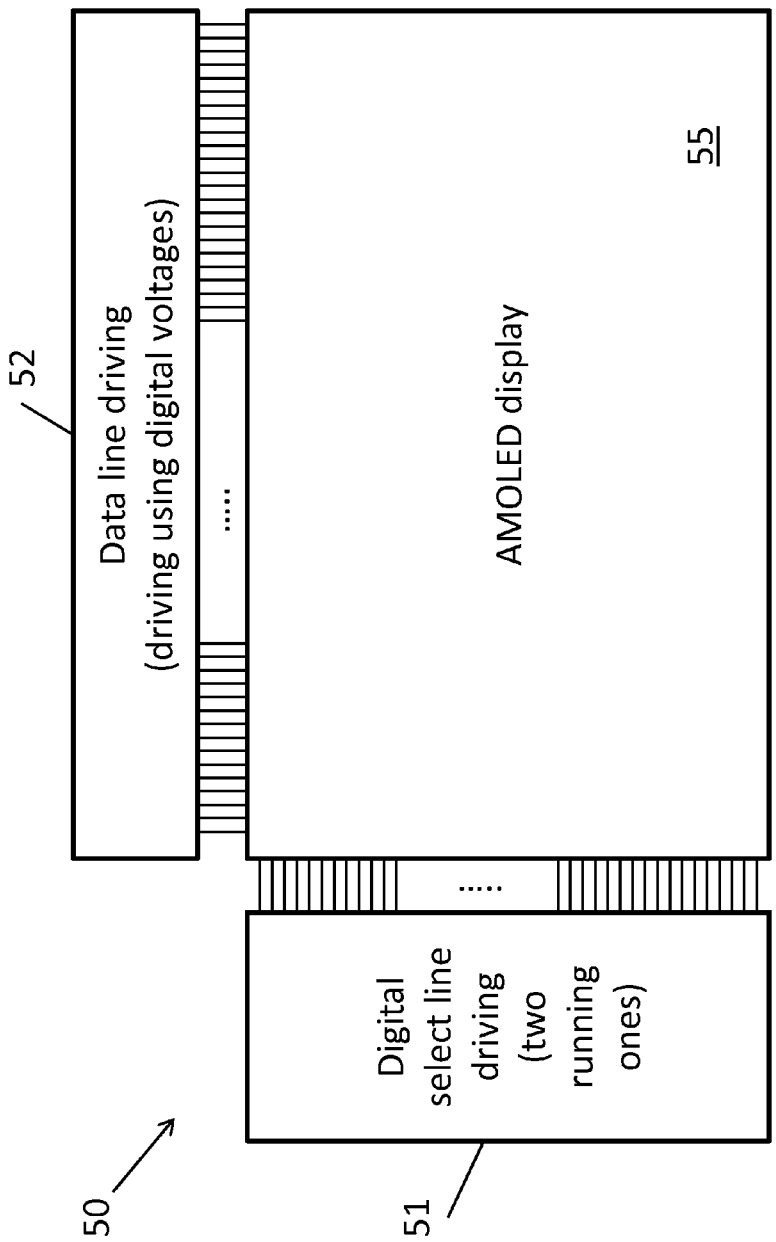
FIG. 5 schematically shows a digitally driven AMOLED display architecture as an example of an active matrix display architecture in accordance with embodiments of the present invention.

FIG. 5 schematically shows a digital driven AMOLED display architecture 50, as a particular type of active matrix display, in accordance with an aspect of the present invention. This architecture 50 comprises an AMOLED display 55 comprising an array of OLED pixel elements (not illustrated in detail in FIG. 5) logically organised in rows and columns. The driving circuitry for driving these OLED pixel elements is based on digital select line (row) driving circuitry 51 using two select signals for at least one of the rows, for instance implemented by running ones, and digital data line (column) driving circuitry 52. Digital driving can be done for instance using Pulse Density Modulation methods, for instance Pulse Width Modulation. It is an advantage of this architecture as compared to existing digital driving architectures that switching of the transistors in the backplane of the display can be slower and that the driving circuitry can be less complex and less space consuming.

In a method for digital pixel driving according to an aspect of the present invention, the select line driving circuitry 51 provides two select signals, for instance two running ones, providing a first selection and a second selection, thereby sequentially selecting at least one, and preferably at least 35% of the plurality of rows, twice within each sub-frame. Within the sub-frames which are selected twice, the second select signal, for instance the second running one, has a fixed predetermined delay with respect to the first running one. This predetermined delay can be different for each sub-frame, thus enabling different digital output combinations, as further explained.

EXAMPLE 2

In one embodiment (further illustrated in FIG. 6 and FIG. 7), after selection of a row by the first select signal, a digital code corresponding to a bit of the digital image code is written to the corresponding pixels of that row. For example, upon selection of a row by the first running one a pixel is switched ON if the corresponding data bit is a logical 1. The pixel remains switched OFF if the corresponding data bit is a logical 0. The second select signal switches the pixel OFF.

Figure 6:
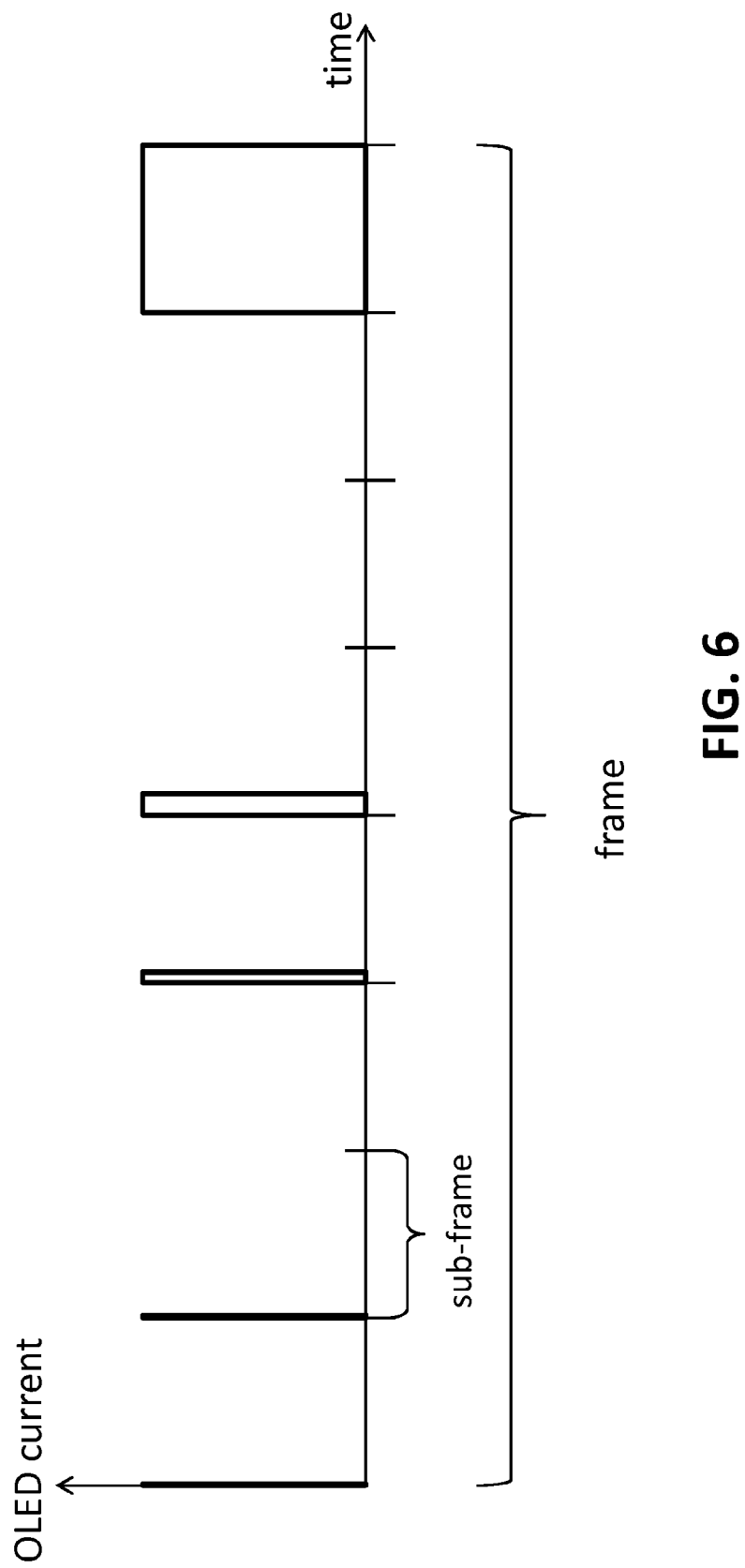
FIG. 6 illustrates, as an example of an embodiment of driving circuitry of the present invention, the light intensity of a pixel within a frame period, for a signal with digital representation 10011011.

In one embodiment, as illustrated in FIG. 6, the data code is an n-bit code representing pixel intensity data representing the image, for instance 8-bit code. Each frame may be divided in N=n sub-frames, in the case illustrated 8 sub-frames. The method starts with a first sub-frame displaying, upon the first select signal going high, the least significant bit of the 8 bit (n bit) digital representation of an image frame. If the select signals are running ones, the present invention not being limited thereto, the first running one starts running at the beginning of the first sub-frame and the second running one follows with a time delay equal to $1/128$ ($1/2^{n-1}$) of the duration or length of the sub-frame. For each pixel in a pixel row, the corresponding image data bit is written upon selection of that row by the first select signal.

When the least significant bit of the corresponding image data is a logical one, the corresponding pixel is turned ON when that pixel row is reached (selected) by the first running one. If the least significant bit is a logical zero the corresponding pixel remains OFF. When the same pixel row is reached by the second running one, the corresponding data line is put to a logical zero and all pixel in that pixel row are switched OFF (or remain OFF). This process is repeated for each subsequent bit of the digital image data, but the delay between the first running one and the second running one is for each subsequent sub-frame doubled. For example, for the second sub-frame the delay is equal to $1/64$ ($1/2^{n-2}$) of the sub-frame duration, for the third sub-frame the delay is equal to $1/32$ ($1/2^{n-3}$) of the sub-frame duration, and so on. Finally, when the most significant bit is reached at the last sub-frame, a full sub-frame delay is obtained between the first running one and the second running one. The second running one does not start running, and this last sub-frame is only selected once.

In embodiments of the present invention as described above, the pixels are at full intensity only during a part of a sub-frame period, and the pixels are off during the remaining part of the sub-frame period. This is different from prior art digital driving methods, wherein the pixels are at a constant intensity (either ON or OFF) within a whole sub-frame period. It is an additional difference with prior art digital driving methods that in embodiments of the present invention all sub-frames may have a substantially equal length, whereas in prior art methods all sub-frames have a substantially different length or duration (e.g. having a ratio of 2 between different sub-frame lengths).

Figure 7:
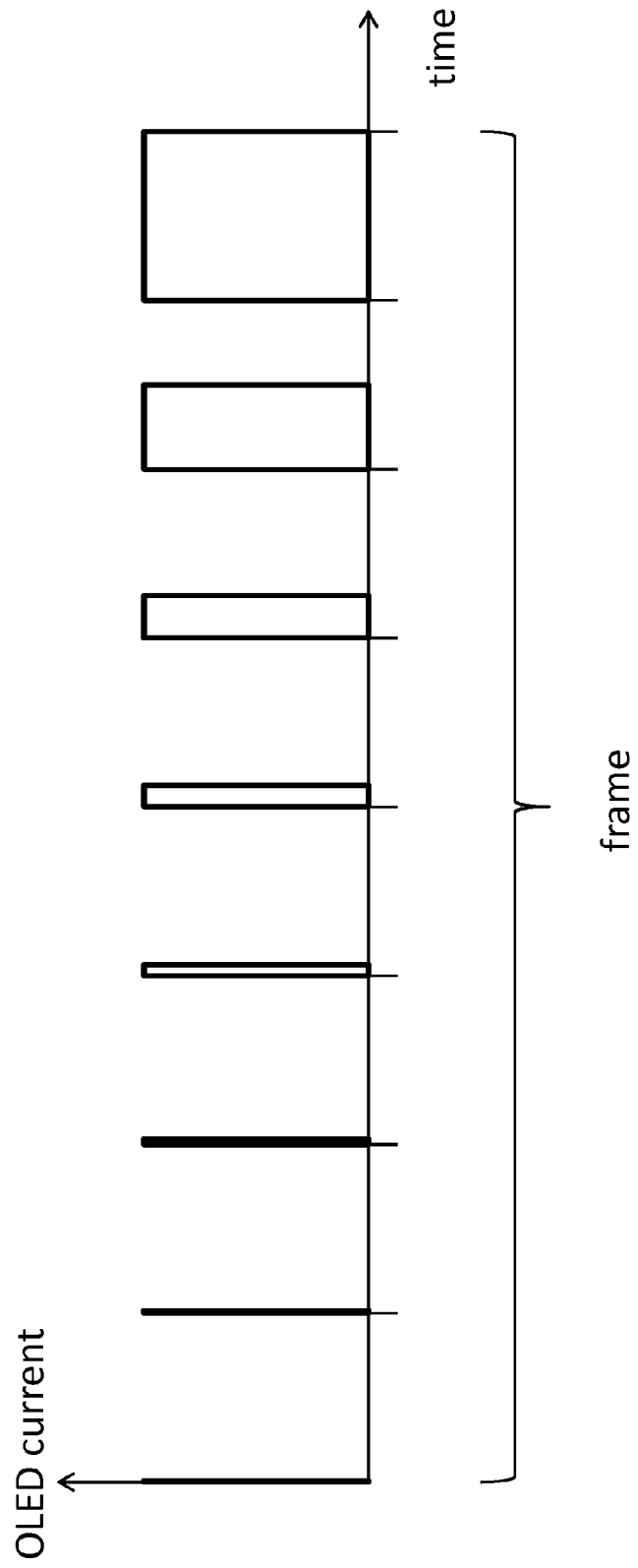
FIG. 7 illustrates, as an example of an embodiment of driving circuitry of the present invention, the light intensity of a pixel within a frame period, for a signal with digital representation 11111111.

FIG. 6 illustrates as an example the light intensity of a pixel within a frame, for a signal with digital representation HGFEDCBA=10011011, for the first selection with a duration of $1/2^{n-x}$ and a second OFF selection. Analogously, FIG. 7 illustrates the light intensity of a pixel within a frame for a signal with digital representation HGFEDCBA=11111111, for the same regime. It can be seen that for this embodiment the pixels are driven at a reduced overall duty cycle of at most 25% (as in FIG. 7), or less (15% in FIG. 6). Especially the sub-frames corresponding to the least significant bits have a very low duty cycle: most of the sub-frame period they are OFF.

EXAMPLE 3

In another embodiment of a method according to an aspect of the present invention, the duty cycle can be substantially increased, to almost 100%. It is to be noted that, for the case illustrated with an 8-bit data code, applying the alternative embodiment in which N equals the (superior) closest power of 2 is trivial, because 8 is a power of 2, so N also equals 8 and the frame will be divided in 8 sub-frames. For example, for an n (8) bit display each sub-frame can be divided into $2^n/N$ ($2^8/8=32$) time slots, resulting in a total of $2^n$ ($2^8=256$) time slots per frame period. The LSB is assigned to one time slot, the second LSB is assigned to 2 time slots, the next bit is assigned to 4 time slots, and so on, doubling the number of time slots for every next more significant bit. The MSB is assigned to $2^{n-1}$ time slots (in case of 8 bits, 128 time slots). As compared to the embodiments described above, within the OFF time of lower significant bits, rather than completely switching OFF the pixels, part of the information from the most significant bits is used to drive the pixels (e.g. OLEDs). In embodiments of the present invention, the first sub-frame introduces a digital zero code for the first selection, and the last sub-frame is selected only once.

This example of an implementation for an 8 bit display is illustrated in the data line driving table Table 2. In the example, the 8 image data bits are HGFEDCBA. A frame is divided into 8 sub-frames of substantially equal duration and each sub-frame is divided into 32 time slots of substantially equal duration. As the most significant bit (H) corresponds to 128 time slots and the second most significant bit (G) corresponds to 64 time slots, both are longer than the length of a single sub-frame. Therefore these bits are distributed over different sub-frames.

Also in this embodiment the select line driving circuitry 51 provides two select signals, for instance two running ones, e.g., a first running one and a second running one. The first select signal, e.g. first running one, and the second select signal, e.g. second running one, drive the rows. For the embodiment where the first and second select signals are implemented as running ones, the first running one and the second running one are cycling at N times (8 times) the frame rate. Within each sub-frame, the second running one runs with a fixed predetermined delay with respect to the first running one. This predetermined delay can be different for different sub-frames. Within each sub-frame, a first code is driven upon applying the first running one and a second code is driven upon applying the second running one. The first code corresponds to a first predetermined bit of the image data and the second code corresponds to a second predetermined bit of the image data. They are preferably distributed over the different sub-frames in such a way that the duty cycle is maximized, as for example illustrated in Table 2. The select signal, e.g. first running one, can switch a pixel ON (if the corresponding bit is a logical 1) or OFF (if the corresponding bit is a logical 0). The second select signal, e.g. second running one, can switch a pixel ON (if the corresponding bit is a logical 1) or OFF (if the corresponding bit is a logical 0).

TABLE 2

| Sub-Frame number (length code a, code b) | code driven after running one a | code driven after running one b |
| --- | --- | --- |
| 1 (1, 31) | 0 | H |
| 2 (1, 31) | A | H |
| 3 (2, 30) | B | H |
| 4 (4, 28) | C | H |
| 5 (8, 24) | D | G |
| 6 (8, 24) | H | G |
| 7 (16, 16) | E | G |
| 8 (32, /) | F | / |

In the example shown in Table 2, in the first sub-frame the fixed delay between the first running one and the second running one corresponds to the duration of 1 time slot (i.e., $\frac{1}{2^n}$ of the frame time). In a first time slot of the first sub-frame the pixel is OFF (logical 0) and in the remaining 31 time slots of the first sub-frame the most significant bit (H) drives the pixel. If the most significant bit is a logical 1, the pixel is ON during these 31 time slots; if the most significant bit is a logical 0, the pixel is OFF. In the second sub-frame the fixed delay between the first running one and the second running one corresponds to the duration of 1 time slot (i.e., $\frac{1}{2^n}$ of the frame time). In a first time slot of the second sub-frame the least significant bit (A) drives the pixel, and in the remaining 31 time slots of the second sub-frame the most significant bit (H) drives the pixel. In the third sub-frame the fixed delay between the first running one and the second running one corresponds to the duration of 2 time slots (i.e., $\frac{1}{2^{n-1}}$ of the frame time). In a first and second time slot of the third sub-frame the second least significant bit (B) drives the pixel, and in the remaining 30 time slots of the third sub-frame the most significant bit (H) drives the pixel. In the fourth sub-frame the fixed delay between the first running one and the second running one corresponds to the duration of 4 time slots (i.e., $\frac{1}{2^{n-2}}$ of the frame time). In the first four time slots of the fourth sub-frame, bit C drives the pixel, and in the remaining 28 time slots of the fourth sub-frame the most significant bit (H) drives the pixel. In the fifth sub-frame the fixed delay between the first running one and the second running one corresponds to the duration of 8 time slots (i.e., $\frac{1}{2^{n-3}}$ of the frame time). In the first 8 time slots of the fifth sub-frame bit D drives the pixel, and in the remaining 24 time slots of the fifth sub-frame the second most significant bit (G) drives the pixel. In the sixth sub-frame the fixed delay between the first running one and the second running one corresponds to the duration of 8 time slots (i.e., $\frac{1}{2^{n-3}}$ of the frame time). In the first 8 time slots of the sixth sub-frame the most significant bit (H) drives the pixel, and in the remaining 24 time slots of the sixth sub-frame the second most significant bit (G) drives the pixel. In the seventh sub-frame the fixed delay between the first running one and the second running one corresponds to the duration of 16 time slots (i.e. $\frac{1}{2^{n-4}}$ of the frame time). In the first 16 time slots of the seventh sub-frame bit E drives the pixel, and in the remaining 16 time slots of the seventh sub-frame the second most significant bit (G) drives the pixel. In the eight sub-frame bit (F) drives the pixel.

In an embodiment as illustrated in Table 2, the distribution of the bits over the different sub-frames is done such that the delay of the second selection (by the second select signal, e.g. second running one) with respect to the first selection (by the first select signal, e.g. first running one) increases step by step. As the second select signal, e.g. second running one, also needs to run a full sub-frame, as does the first select signal, e.g. first running one, it cannot start a next sub-frame before it has finalized the former sub-frame. Hence the delay between the first select signal and the second select signal can only remain the same or increase, not decrease, for any two subsequent sub-frames of a frame. In the last sub-frame of the driving scheme of Table 2, there is no need for a second running one, which enables to catch up, as in the first sub-frame of the next frame the second select signal again has to starts only with a short delay with respect to the first select signal (one time slot, or $\frac{1}{2^n}$ of the frame time, in the embodiment illustrated).

It is an advantage of an approach as illustrated in data line driving table Table 2 that a very good duty cycle can be obtained. For example, when representing a signal with digital representation HGFEDCBA=11111111, according to the data line driving table Table 2, during the first time slot the corresponding pixel is OFF (logical zero) and during the remaining $2^n-1$ time slots the corresponding pixel is ON (logical one). This corresponds to a duty cycle equal to $(2^n-1)/2^n$, or 99.6% for an 8 bit implementation.

For example, when representing a signal with digital representation HGFEDCBA=10011011, in accordance with the data line driving table shown in Table 2, the following bit sequence is used for driving the pixel within a frame: 01111111111111111111111111111111 (i.e., one 0 and 31 times bit H) 11111111111111111111111111111111 (i.e., 1 time bit A and 31 times bit H) 11111111111111111111111111111111 (i.e., 2 times bit B and 30 times bit H) 00001111111111111111111111111111 (i.e., 4 times bit C and 28 times bit H) 11111111000000000000000000000000 (i.e., 8 times bit D and 24 times bit G) 11111111000000000000000000000000 (i.e., 8 times bit H and 24 times bit G)

1111111111111110000000000000000 (i.e., 16 times bit E and 16 times bit G) 00000000000000000000000000000000 (i.e., 32 times bit F).

Figure 8:
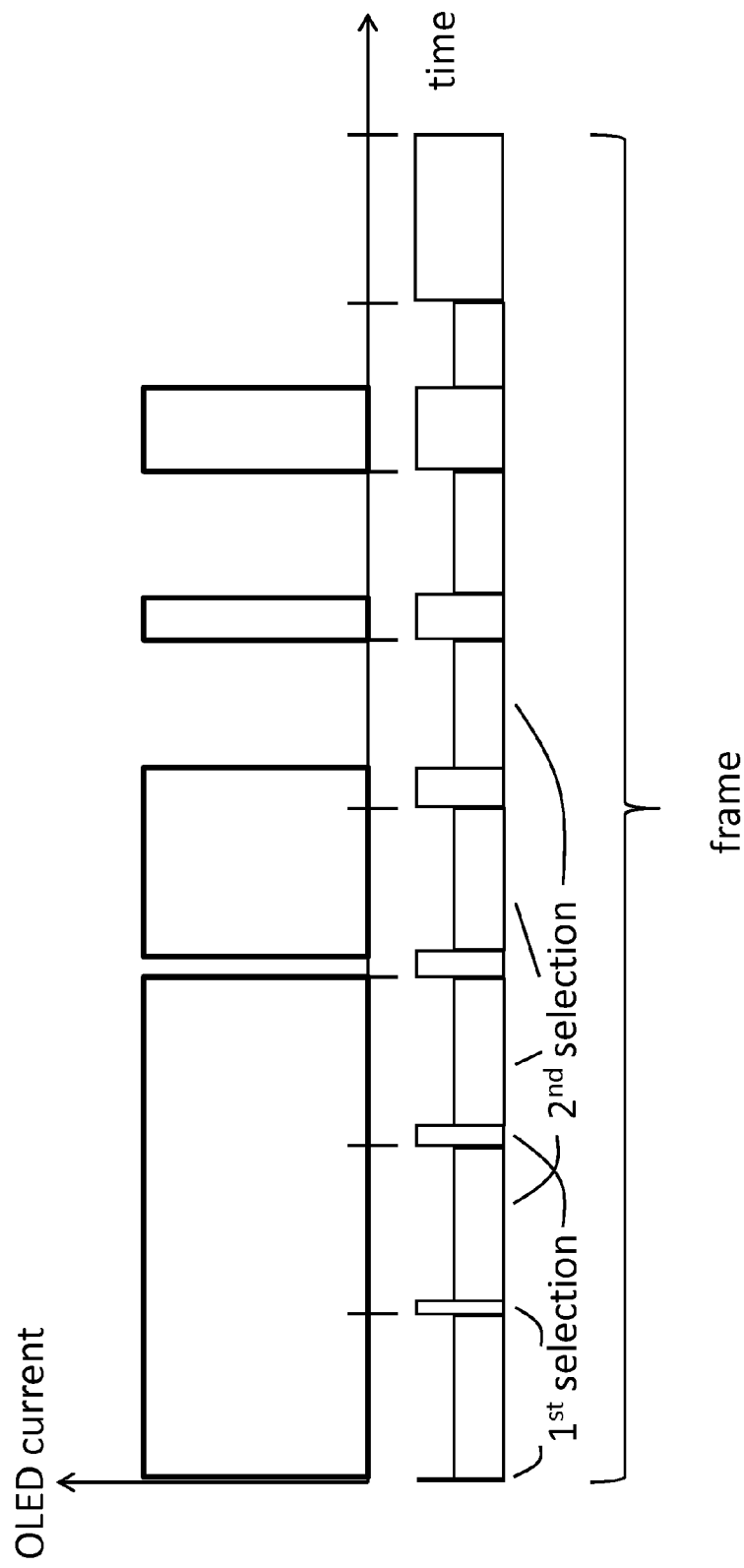
FIG. 8 illustrates the light intensity of a pixel within a frame period, for a signal with digital representation 10011011, according to an embodiment of the present invention which provides an improved duty cycle.

This is schematically illustrated in FIG. 8. It can be seen that the duty cycle of the embodiment shown in FIG. 8 (60.5%) is substantially higher as compared to the implementation for the same data code shown in FIG. 6 (15.1%).

Table 2 only shows an example of how the digital image data can be distributed over a frame. Other implementations with different distributions are possible. For instance, in the next example, n=8 but N is chosen arbitrarily; in this case N=5, and the sub-frames do not have the same duration.

EXAMPLE 4

In a general case, it is possible to divide a frame in a given number of sub-frames and assign each bit of the image code to each of the two selections in the at least one sub-frame. The sub-frames may have the same duration, but in this particular embodiment each sub-frame has a different duration. It is further possible to divide the sub-frames in time slots. The time slots may have the same duration or not. For simplicity, it shall be considered the case in which, while sub-frames do not have necessarily the same duration, time slots have the same duration (in this case, different sub-frames would comprise different number of time slots). For example, if n=8 (eight bits, HGFEDCBA) and the frame is divided in, for example, N=5 sub-frames, then the first sub-frame may contain 128 time slots, the second 65, the third 34, and the fourth and fifth 20.

In the next step, each bit of the bit image code is assigned to a given number of time slots. The most significant bits have more time slots assigned. In this case, the time slots can be assigned to each of the 8 bits according to their position m in the n-bit data code, following the rule $2^{m-1}$ time slots. Hence, the MSB (H) would run $2^7$ time slots, and the LSB (A) would run one time slot ($2^0$). The rest of the data line driving table is shown in Table 3.

TABLE 3

| Sub-Frame number (length code a, code b) | code driven after running one a | code driven after running one b |
| --- | --- | --- |
| 1 (128, /) | H | / |
| 2 (1, 64) | A | G |
| 3 (2, 32) | B | F |
| 4 (4, 16) | C | E |
| 5 (8, 12) | D | 0 |

According to embodiments of the present invention, the rows are selected once in each sub-frame, and a second time in at least one of the sub-frames (in this case, the last four sub-frames).

Again, the distribution of the bits over the different sub-frames is done such that the delay of the second selection (by the second select signal, e.g. second running one) with respect to the first selection (by the first select signal, e.g. first running one) increases step by step. As the second select signal, e.g. second running one, also needs to run a full sub-frame, as does the first select signal, e.g. first running one, it cannot start a next sub-frame before it has finalized the former sub-frame. Hence the delay between the first select signal and the second select signal can only remain the same or increase, not decrease, for any two subsequent sub-frames of a frame. In the first sub-frame of the driving scheme of Table 3, there is no need for a second running one, which enables to catch up in any further frames beyond the first one, as in the second sub-frame of the next frame the second select signal again has to start only with a short delay with respect to the first select signal (one time slot in the embodiment illustrated).

In the following examples, different numbers of bits will be studied for the cases in which the rows are selected twice per sub-frame with a time delay between them according to the position of the bit in the image data code, and for the alternative case in which the sub-frames are divided in time slots, selecting rows twice in at least 1 case and assigning time slots according to the position of the bit in the image data code.

EXAMPLE 5

In the case of four bit image code, n=4, the code will be written as DCBA. The frame can be divided in 4 sub-frames. The rows can be selected twice in 3 sub-frames, the first selection introducing data code, the second selection turning the pixel OFF. The time delay between the first selection and the second selection, as before, increases with the sub-frame. For instance, the LSB may be driven during the first sub-frame during $\frac{1}{2}^{4-1}$ of the sub-frame period, as before. The next bit, in the second sub-frame during $\frac{1}{2}^{3-1}$ of the sub-frame period; the following bit in the $3^{rd}$ sub-frame during $\frac{1}{2}$ of the sub-frame period, and the MSB is driven in the last sub-frame, for the whole sub-frame. Only one selection is needed in this sub-frame.

Alternatively, each sub-frame can be divided in $2^n/N$ sub-frames, the N being the power of 2 equal or the closest superior to n, which in this case is precisely n. Each sub-frame is considered with the same duration and divided in 4 time slots. The bits of the image code will be assigned to time slots in each sub-frame twice in 3 sub-frames, and only once in the last sub-frame, according to Table 4.

TABLE 4

| SubFrame number (length code a, code b) | code driven after running one a | code driven after running one b |
| --- | --- | --- |
| 1 (1, 3) | 0 | D |
| 2 (1, 3) | A | D |
| 3 (2, 2) | B | D |
| 4 (4, /) | C | / |

The double selection is performed in 3 of the 4 sub-frames, and the data from the image data code is driven for 15 out of the 16 time slots.

EXAMPLE 6

In the case of nine bit image code, n=9, the code will be written as IHGFEDCBA. The frame can be divided in N=9 sub-frames. The rows can be selected twice in 8 of the sub-frames, the first selection introducing data code, the second selection turning the pixel OFF. The time delay between the first selection and the second selection increases with the sub-frame according to $\frac{1}{2}^{x-1}$ of the sub-frame period, x corresponding to the position of the bit in the image data code, the length of the selection chosen according to the importance of the bit, as seen before: the LSB would be driven for $\frac{1}{2}^8$ sub-frame periods in the first sub-frame, the MSB would be driven for the whole sub-frame, in the last sub-frame.

Alternatively, each sub-frame can be divided in N sub-frames, the N being the power of two equal or the closest superior to n, which in this case is $2^4=16$ sub-frames. Each sub-frame is considered with the same duration and divided in $2^9/2^4=2^5=32$ time slots. The bits of the image code will be assigned to time slots according to Table 5, following the same scheme as the previous embodiments.

TABLE 5

| Sub-Frame number (length code a, code b) | code driven after running one a | code driven after running one b |
|---|---|---|
| 1 (1, 31) | 0 | / |
| 2 (1, 31) | A | / |
| 3 (2, 30) | B | / |
| 4 (4, 28) | C | / |
| 5 (8, 24) | D | / |
| 6 (16, 16) | E | / |
| 7 (32, /) | F | / |
| 8 (32, /) | G | / |
| 9 (32, /) | G | / |
| 10 (32, /) | H | / |
| 11 (32, /) | H | / |
| 12 (32, /) | H | / |
| 13 (32, /) | H | / |
| 14 (32, /) | I | / |
| 15 (32, /) | I | / |
| 16 (32, /) | I | / |

As before, at least one sub-frame is selected twice (the first six sub-frames are run twice, the other ten sub-frames are run only once). The time slots are distributed between the bits in the image code in the different sub-frames, according to their significance: $2^{m-1}$ time slots for the $m^{th}$ bit in the code. For example $2^8$ time slots are assigned to the MSB (bit in position I) and one time slot is assigned to the LSB (bit in position A).

EXAMPLE 7

In the case of fourteen bit image code, n=14, the code will be written as NMLKJIHGFEDCBA. The frame can be divided in N=14 sub-frames. The rows can be selected twice in 13 sub-frames, the first selection introducing data code, the second selection turning the pixel OFF. The time delay between selections is the same as in previous embodiments, $\frac{1}{2}^{n-x}$ of the sub-frame period, and the length of the selection chosen according to the importance of the bit, as seen before: the LSB would be driven for $\frac{1}{2}^{13}$ sub-frame periods in the first sub-frame, the MSB would be driven for the whole sub-frame, in the last sub-frame.

Alternatively, each sub-frame can be divided in N sub-frames, the N being the power of two equal or the closest superior to n, which in this case is $2^4=16$ sub-frames. Each sub-frame is considered, for instance, with the same duration and divided in $2^{14}/2^4=2^{10}=1024$ time slots. The bits of the image code will be assigned to time slots according to Table 6, following a similar scheme as the previous embodiments.

The first twelve sub-frames are driven with data twice (two selections), the last four are driven with data only once. As before, the 1024 time slots per sub-frame are distributed between the bits in the image code, according to their significance: $2^{m-1}$ time slots for the $m^{th}$ bit in the code. For example $2^{13}$ time slots are assigned to the MSB (bit in position M) and one time slot is assigned to the LSB (bit in position A).

TABLE 6

| Sub-Frame number (length code a, code b) | code driven after running one a | code driven after running one b |
|---|---|---|
| 1 (1, 1023) | 0 | N |
| 2 (1, 1023) | A | N |

TABLE 6-continued

| Sub-Frame number (length code a, code b) | code driven after running one a | code driven after running one b |
|---|---|---|
| 3 (2, 1022) | B | N |
| 4 (4, 1020) | C | N |
| 5 (8, 1016) | D | N |
| 6 (16, 1008) | E | N |
| 7 (32, 992) | F | N |
| 8 (64, 960) | G | N |
| 9 (128, 896) | N | M |
| 10 (128, 896) | H | M |
| 11 (256, 768) | I | M |
| 12 (512, 512) | J | M |
| 13 (1024, /) | K | / |
| 14 (1024, /) | L | / |
| 15 (1024, /) | L | / |
| 16 (1024, /) | M | / |

EXAMPLE 8

In the case of sixteen bit image code, n=16, the code will be written as QPNMLKJIHGFEDCBA. The frame can be divided in N=16 sub-frames. The rows can be selected twice in 15 of the sub-frames, the first selection introducing data code, the second selection turning the pixel OFF. The time delay between selections is the same as in previous embodiments, $\frac{1}{2}^{x-1}$ of the sub-frame period for the $x^{th}$ bit, which would correspond the $x^{th}$ sub-frame, and the length of the selection chosen according to the importance of the bit, as seen before (LSB driven for $\frac{1}{2}^{15}$ sub-frame periods in the first sub-frame, the MSB driven for the whole sub-frame, in the last sub-frame).

Alternatively, each sub-frame can be divided in N sub-frames of equal duration, the N being the power of two equal or the closest superior to n, which in this case is 16 sub-frames (coinciding with the number of bits). Each sub-frame is divided in $2^{16}/2^4=2^{12}=4096$ time slots. The bits of the image code will be assigned to time slots according to table 7, following the same scheme as the previous embodiments.

The first fifteen sub-frames are driven with data twice (two selections), the last is driven with data only once. The 4096 time slots per sub-frame are distributed between the bits in the image code, according to their significance: $2^{m-1}$ time slots for the $m^{th}$ bit in the code, so $2^{15}$ time slots are assigned to the MSB (bit in position Q) and one time slot is assigned to the LSB (bit in position A). Because only the first time slot of the first frame is driven with a fixed 0, the rest (99.97%) of the frame time is driven with data from the image code.

TABLE 7

| SubFrame number (length code a, code b) | code driven after running one a | code driven after running one b |
|---|---|---|
| 1 (1, 4095) | 0 | Q |
| 2 (1, 4095) | A | Q |
| 3 (2, 4094) | B | Q |
| 4 (4, 4092) | C | Q |
| 5 (8, 4088) | D | Q |
| 6 (16, 4080) | E | Q |
| 7 (32, 4064) | F | Q |
| 8 (64, 4032) | G | Q |
| 9 (128, 3968) | Q | P |
| 10 (128, 3968) | H | P |
| 11 (256, 3840) | I | P |
| 12 (512, 3584) | J | P |

TABLE 7-continued

| SubFrame number (length code a, code b) | code driven after running one a | code driven after running one b |
|---|---|---|
| 13 (1024, 3072) | P | N |
| 14 (1024, 3072) | K | N |
| 15 (2048, 2048) | L | N |
| 16 (4096, /) | M | / |

In the examples shown above, care has been put in that the selections have an increasing time delay, so there are not two first selections running at the same time in different sub-frames, or two second selections running at the same time in different sub-frames (there can be, anyway, a first selection running in a sub-frame, and a second selection running in a previous sub-frame, for example).

Figure 9:
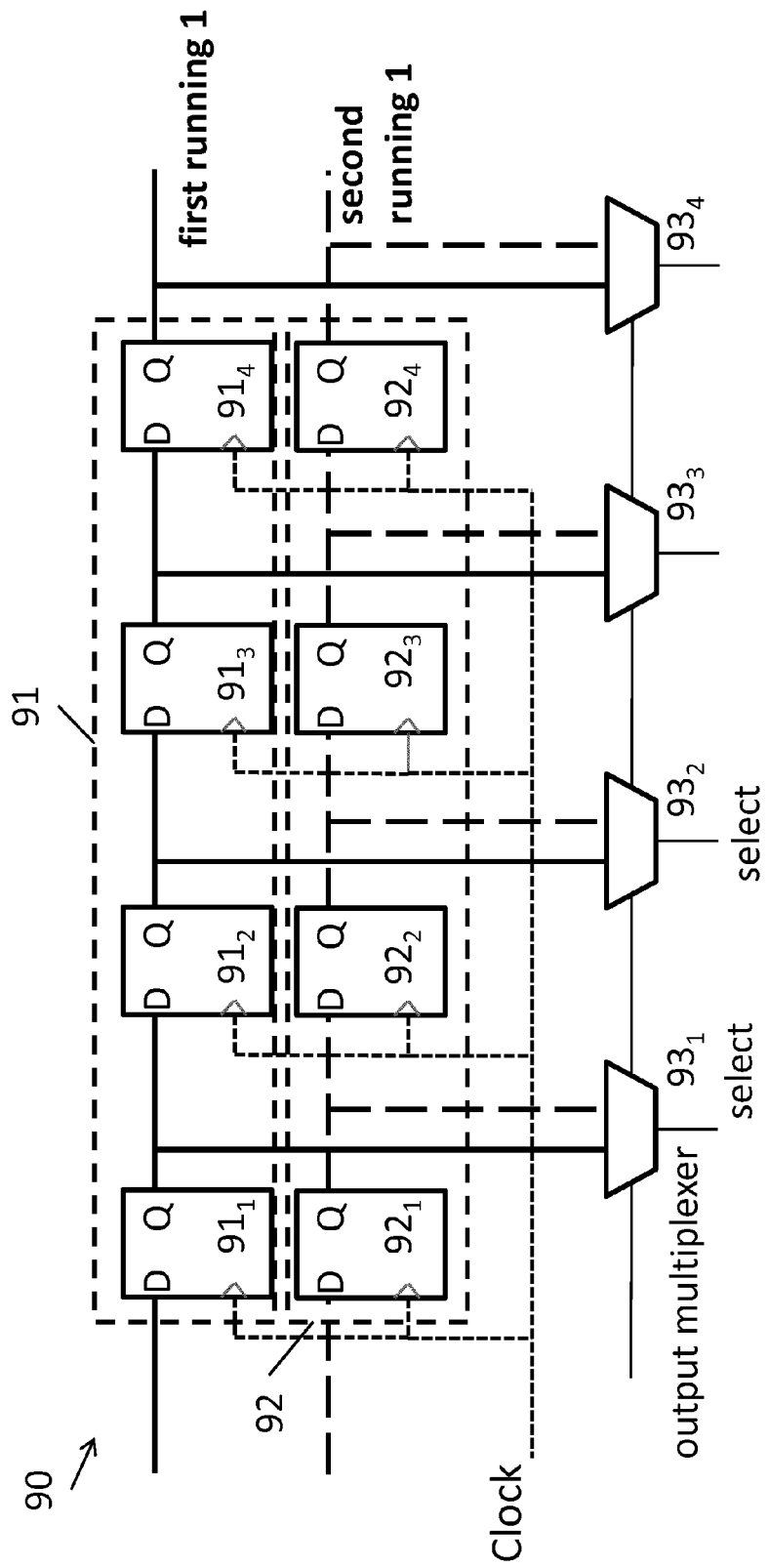
FIG. 9 is a schematic representation of a time delay determination circuit of a select line driving circuit that can be used in embodiments of the present invention.

It is an advantage of embodiments described above that for their implementation in active matrix displays, for instance in AMOLED displays, there is no need for modifications to the display backplane as such, apart from possibly an increase of the size of the select transistor (M2 in FIG. 1) and/or a decrease of the pixel capacitance (C1 in FIG. 1) if needed to obtain a sub-frame rate which is n times higher than in existing analog approaches. For many implementations, current active matrix display backplanes, e.g. AMOLED backplanes, could be used. Only a modification of the select line driver circuitry (e.g., as illustrated in FIG. 9) and the data line driver circuitry (selection of the correct data bit for each sub-frame) is needed.

It is an advantage of embodiments of the present invention that it allows using the drive transistors of the pixels (M1 in FIG. 1) in the linear regime instead of in saturation. Working in the linear regime results in a strong reduction of the voltage drop over the drive transistor M1 (e.g., from more than 4 Volt in saturation to about 0.1 V or less in the linear regime). This would result in a significant reduction of the power consumption of the display. It would also enable driving the display directly from battery voltages as typically used in mobile devices.

In another aspect, the present invention relates to digital driving circuitry for driving an active matrix display such as, but not limited thereto, an AMOLED display arranged with pixels, the display comprising, for instance, LCD pixel elements, LED pixel elements or OLED pixel elements such as fluorescent OLEDs, phosphorescent OLEDs, or light-emitting polymers, or polydendrimers. The pixels can be logically arranged in rows and columns, so the display forms a matrix capable of displaying images in consecutive frames of a certain duration.

The digital driving circuitry may comprise digital select line driving circuitry 51 for sequentially selecting the plurality of rows and digital data line driving circuitry 52 for writing the digital image code, represented by an n-bit image code, to corresponding pixels in a selected row. The digital select line driving circuitry 51 is adapted for sequentially selecting, within one sub-frame, at least one of the plurality of rows twice, so as to, upon a first selection, write a first digital code to the selected row and, upon a second selection, write a second digital code to the selected row, there being a predetermined time delay between the second selection and the first selection. This time delay, which may be controlled by a time delay determination circuit, is chosen so that the delay between the first select signal and the second select signal remains the same or increases, but does not decrease, for any two subsequent sub-frames of a frame.

FIG. 9 shows an exemplary select line driving circuit 90 that can be used for generating a first and a second select signal under the form of a first running one and a second running one. In the select line driving circuit 90 shown in FIG. 9, the first running one and the second running one are each generated using a linear array 91, 92 of D-flip-flops, each array 91, 92 comprising maximum a single logical one, which advances through the array of flip-flops 91, 92 by one position each clock pulse. The first running one advances row by row through the lines of the display 55, progressing one row at each clock pulse. The second running one also advances row by row through the lines of the display 55, progressing one row at each clock pulse, but with a delay corresponding to a predetermined number of clock pulses with respect to the first running one. The invention is not restricted to D-flip-flops; any other suitable implementation of a dynamic or static shift register can be used. An even more compact implementation of the time delay determination circuit is a transparent latch with, for instance, two or three clocks.

As can be seen from FIG. 9, in order not to provide the first and the second select signal to the same row at the same time, a number of selectors, e.g. multiplexers $93_i$, are provided, having as input both the first and the second select signal, and as output any of the first or second select signal, depending on a control signal for controlling the selectors $93_i$, which control signal may be emanating from a controller and may be generated taking into account the number of time slots the code needs to be applied.

Consider, for instance, a first and a second running one are cycling through the arrays 91, 92 of D flip-flops, the first running one for instance residing in flip-flop $91_2$ and the second running one residing in flip-flop $92_1$, there thus being a delay of 1 clock cycle between both. The control signal to the selectors $93_i$ may be such that during a first time period, equal to a first predetermined number of time slots, the first running one is applied to the rows, and during a second time period, equal to a second predetermined number of time slots, the second running one is applied to the rows. During the first time period, the first running one will be applied to the row corresponding and connected to selector $93_2$, and image data present on and provided by the data line driving circuitry 52 will be put on this corresponding row. During the second time period, the second running one will be applied to the row corresponding and connected to selector $93_1$, and image data present on and provided by the data line driving circuitry 52 will be put on this corresponding row. This way, data cannot be written to two rows simultaneously, despite the two select signals, e.g. two running ones, being present in the digital select line driving circuitry 51.

Figure 10:
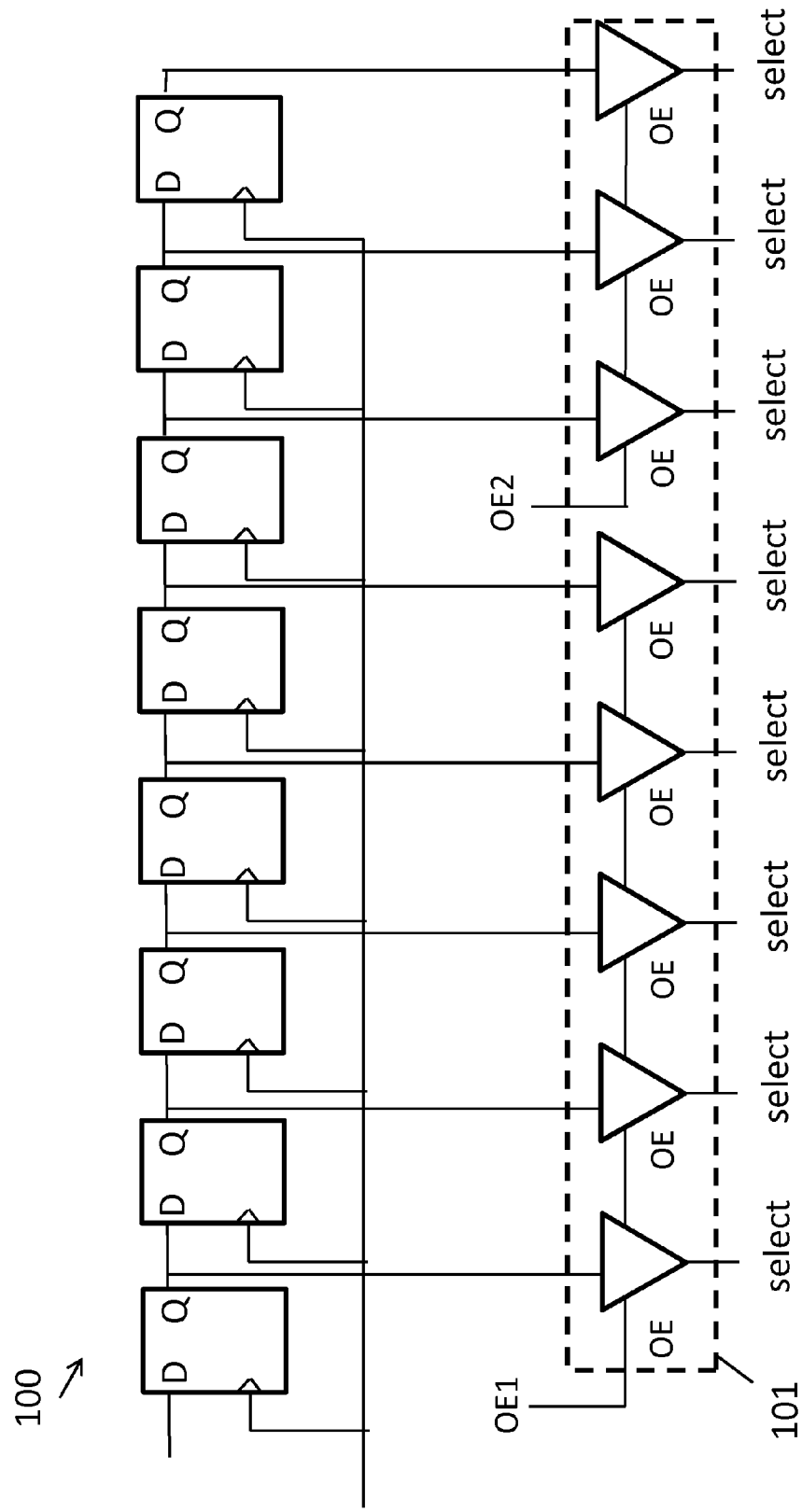
FIG. 10 is a schematic representation of a time delay determination circuit of a select line driving circuit comprising Output Enable circuitry.

Alternatively to the embodiment illustrated in FIG. 9, a select line driving circuit 100 as illustrated in FIG. 10 can be used, in which the multiplexers $93_i$ have been substituted by output enable circuitry 101, grouped in blocks according to the minimum delay between selections. An odd number of clocks may be provided for driving the output enable circuitry 101.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention.

The invention claimed is:

1. A method for digital driving of an active matrix display with a predetermined frame rate, the display comprising a plurality of pixels logically organized in a plurality of rows and a plurality of columns, the method comprising:
representing each of a plurality of pixels of an image to be displayed within an image frame by an n-bit digital image code;
dividing the image frame into a natural number of sub-frames;
within each sub-frame of a respective image frame, sequentially selecting at least two or more of the plurality of rows twice, wherein sequentially selecting a row includes a sequential first selection and second selection of the row, wherein upon the first selection a first digital code is written to the selected row and upon the second selection a second digital code is written to the selected row, there being a predetermined time delay between the second selection and the first selection, wherein the first digital code and the second digital code are written respectively by driving the first digital code and the second digital code using pulse-width modulation, and wherein the first digital code corresponds to a first predetermined bit of the n-bit digital image code and the second digital code corresponds to a second predetermined bit of the n-bit image code.

2. The method according to claim 1, wherein dividing the image frame comprises dividing the image frame into sub-frames of equal duration.

3. The method according to claim 1, wherein the second selection of the plurality of rows takes place for at least 35% of the sub-frames.

4. The method according to claim 3, wherein the second selection of the plurality of rows takes place for all but the last few sub-frames.

5. The method according to claim 1, wherein dividing the image frame into sub-frames comprises dividing the image frame into N sub-frames, wherein N is equal to n.

6. The method according to claim 1, wherein n is not a natural power of two, wherein dividing the image frame into sub-frames comprises dividing the image frame into N sub-frames, wherein N is a power of 2 superior and closest to n.

7. The method according to claim 1, wherein each sub-frame is further divided into time slots.

8. The method according to claim 7, further comprising assigning a number of time slots to each bit of the n-bit digital image code according to each bit significance in the code.

9. The method according to claim 8, wherein each sub-frame is further divided into $2^n/N$ time slots.

10. The method according to claim 1, wherein a time delay between the second selection and the first selection in a $x^{th}$ sub-frame corresponds to $\frac{1}{2}^{N-x}$ of the sub-frame duration.

11. The method according to claim 10, further comprising assigning $2^{m-1}$ time slots to the $m^{th}$ bit of the n-bit image code.

12. The method according to claim 1, wherein the time delay between the second selection and the first selection in a sub-frame within one frame is not smaller than the time delay between the second selection and the first selection in an earlier sub-frame within the one frame.

13. The method according to claim 1, wherein the number of bits used per image color (n-bit gray scale) is 8.

14. Digital driving circuitry for driving, with a predetermined frame rate, an active matrix display that includes a plurality of pixels logically organized in a plurality of rows and a plurality of columns, so as to display subsequent frames of an image to be displayed, the image being represented by an n-bit digital image code for each pixel to be displayed within an image frame, and the image frame being divided into a natural number of sub-frames, the digital driving circuitry comprising:
digital select line driving circuitry configured to sequentially select the plurality of rows; and
digital data line driving circuitry configured to write the digital image code to corresponding pixels in a selected row;
wherein the digital select line driving circuitry is further configured to sequentially select, within each sub-frame of a respective image frame, at least two or more of the plurality of rows twice, so as to, upon a first selection, write a first digital code to the selected row and, upon a sequential second selection, write a second digital code to the selected row, there being a predetermined time delay between the second selection and the first selection, wherein the first digital code and the second digital code are written respectively by driving the first digital code and the second code using pulse-width modulation, and wherein the first digital code corresponds to a first predetermined bit of the n-bit digital image code and the second digital code corresponds to a second predetermined bit of the n-bit digital image code.

15. The digital driving circuitry according to claim 14, wherein the digital select line driving circuitry further comprises a time delay determination circuit for determining the predetermined time delay between the second selection and the first selection.

16. The digital driving circuitry according to claim 15, wherein the time delay determination circuit comprises a shift register.

17. An active matrix display comprising an array of light emitting elements arranged for being driven by the digital driving circuitry according to claim 16.

18. The active matrix display according to claim 17, wherein the active matrix display is an active matrix organic light emitting diode (AMOLED) display.

19. The active matrix display according to claim 18, wherein the light emitting elements are any of fluorescent organic light emitting diodes (OLEDs), phosphorescent OLEDs, light emitting polymers, or polydendrimers.

* * * * *